April 26, 1966  H. C. BRANCH  3,247,899
PLATE TYPE HEAT EXCHANGER
Filed April 10, 1963
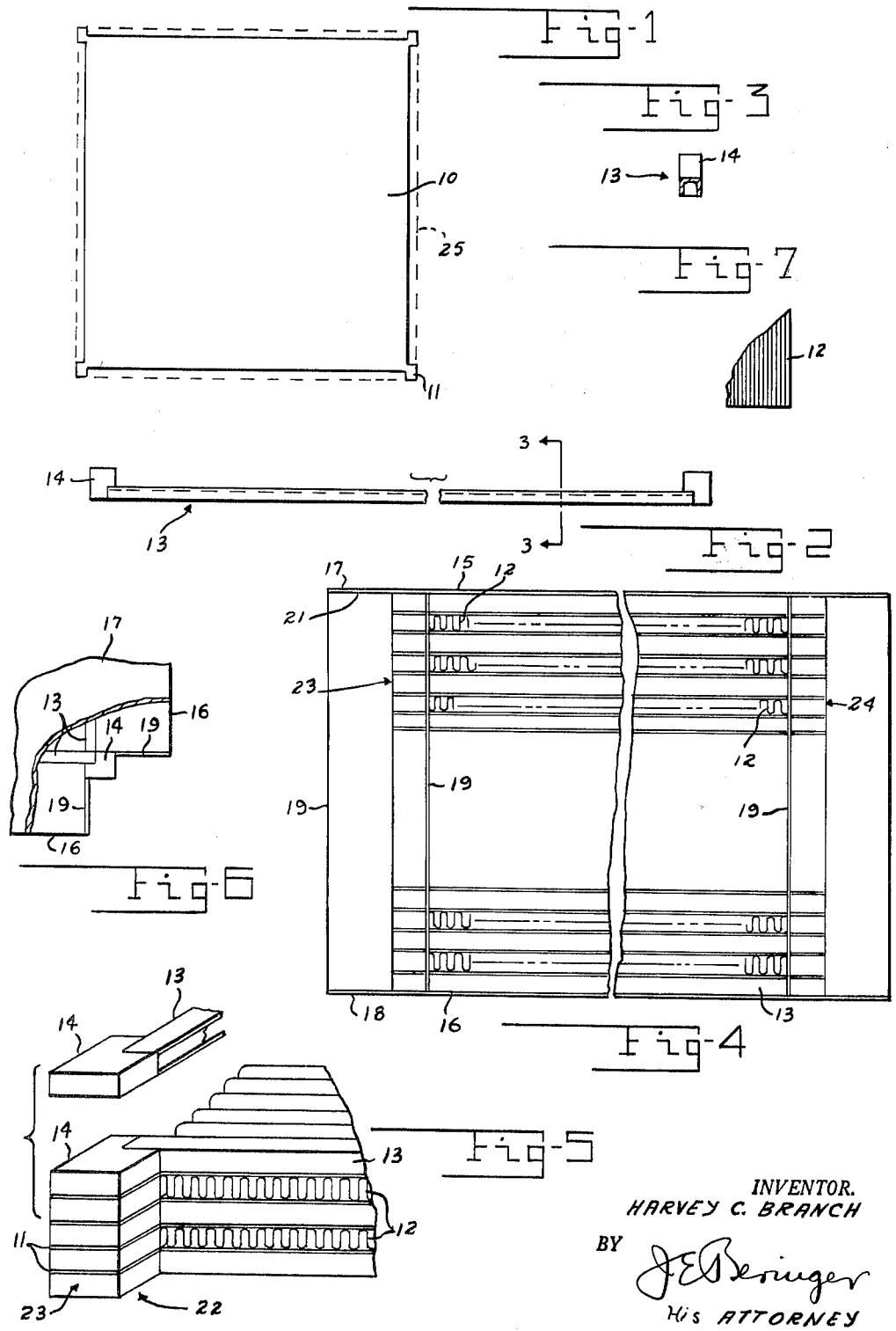
INVENTOR.
HARVEY C. BRANCH
BY
J E Beringer
His ATTORNEY United States Patent Office 3,247,899
Patented Apr. 26, 1966

1

3,247,899
PLATE TYPE HEAT EXCHANGER
Harvey C. Branch, Centerville, Ohio, assignor to United Aircraft Products, Inc., Dayton, Ohio, a corporation of Ohio
Filed Apr. 10, 1963, Ser. No. 272,122
7 Claims. (Cl. 165—166)

This invention relates to heat exchange devices of the plate type, having particular although not limited regard to devices adapted for high temperature service.

Heat exchangers of the instant kind are comprised of a plurality of superposed plates and, in alternating relation therewith, strips of a crimped fin material. Marginal devices space the adjacent plates apart and confine side edges of the strip fin material in a manner to form separated passages for flow of different fluids, heat transfer taking place through the separating plates, aided by the interposed strip fin material. The parts of the described assembly are unitarily joined together in a brazing or like process and define a basic core structure. To this core is attached duct work or manifolds directing the heat transfer fluids into and out of the core. The manifolds usually are welded to outwardly facing surfaces of the core.

Devices adapted for high temperature service conventionally are made of relatively heavy metals, for example stainless steel. In the interests of weight conservation the components are made as thin and light in weight as possible, the superposed plates taking the form of thin parting sheets, the spacer means being hollow or channel-like in configuration and the strip fins formed of a ductile, foil-like material. Additionally, the relatively low conductivity of the heavier metals results in high concentrations of heat at weld locations. As a consequence the face of the core is subject to damage by the welding process, or the integrity of the accomplished weld is impaired. Still further, in the latter regard, the presence of a braze alloy on the face of the core at the point of manifold attachment inhibits the creation of a good weld and may result in weld cracking under stress.

An object of the invention is to achieve greater damage resistance and structural integrity of devices of the class described.

Another object of the invention is to achieve ease of fabrication, obviating the need for special care and skill in the welding of header manifolds to the basic core.

A further object of the invention is to introduce a principle of welding to the core through projecting, solid columns formed integrally with the core, it being an attendant object in this connection to effect the weld at a location spaced from the face proper of the core.

Still another object of the invention is to provide on a heat exchanger core as described projecting vertically extending columns of general utility for attachment and mounting purposes.

A still further object of the invention is to facilitate the introduction of brazing alloy into the core through use of integrated, temporary ledges at the face thereof.

Other objects and structural details of the invention will appear from the following description when read in connection with the accompanying drawings, wherein:

FIG. 1 is a plan view of a parting sheet or plate, showing in full lines one form the sheet may take;

FIG. 2 is a view in elevation of a spacer member in accordance with the illustrated embodiment of the invention;

FIG. 3 is a view in cross-section taken substantially along the line 3—3 of FIG. 2;

FIG. 4 is a view in front elevation of a heat exchanger utilizing structural concepts of the invention;

2

FIG. 5 is a fragmentary exploded view in perspective of a portion of the device of FIG. 4;

FIG. 6 is a fragmentary view in plan of the assembly of FIG. 4, showing the manifold means attached to the core; and FIG. 7 is a fragmentary view of a piece of strip fin material.

Referring to the drawings, a core of a heat exchanger in accordance with structural concepts of the invention comprises a plurality of superposed plates 10, these having the character as noted of thin metal parting sheets. While they may take various configurations, in the present instance the plates 10 are square with each side being cut away intermediate its ends to define at each of the four corners a generally rectangular tabular projection 11. Stacked in alternating relation to the sheets 10 are strips 12 of a thin, ductile metal crimped or gathered in a lateral sense to define closely spaced apart convolutions of longitudinal extent.

Also interposed between adjacent parting sheets 10, and effecting a spacing thereof, are spacer bars 13. These are channel shaped in cross-section and have fixed to their ends solid tabs 14 approximately corresponding in outline to the configuration of tabular projections 11. The spacer bars 13 are disposed marginally of the sheets 10 and in a manner to close selected peripheral portions of the space between adjacent sheets. Fluid flow passages are in this manner defined between adjacent sheets, with the fin strips 12 arranged in such passages to lie longitudinally of the direction of flow. Conventionally, different fluids, of respectively different temperature, are directed through adjacent flow passes in order that the fluid of higher temperature may yield up some of its heat to the fluid of lower temperature by conduction through the separating parting sheet. Further in accordance with conventional practice the marginal spacer bars 13 are so arranged with underlying and overlying bars at right angles to one another as to cause the different fluids to flow in a like transverse relationship.

In assembling a heat exchanger core, the parting sheets 10, fin strips 12 and spacer bars 13 are mounted as described in an assembled relation. This assembly is subjected to a brazing operation in which a brazing alloy flows along the bars 13 and along the peaks and valleys of the fin strips 12 in a manner to join the parts in a unitary structure. The tabs 14 elongate the bars 13, further providing such bars with laterally offset projecting portions. The tabs have a thickness or height corresponding to the height of the channel shaped intermediate portion of the bars.

For ease of handling the tabs 14 are preliminarily attached to the channel shaped portion by a spot welding or like process with a permanent joining of the parts taking place during the brazing process. Alternatively the tabs 14 may be formed integrally with the intermediate bar portion and the latter may in turn be made solid and have a round, square or any other suitable shape in cross-section.

In assembling the parts of the core the spacer bars 13 are placed on underlying parting sheets 10 with the closed sides of the bars facing outwardly and with the tabs 14 in aligned superposed relation to the tabular projections 11. In the illustrated instance a pair of oppositely disposed spacer bars is used. Thus a flow passage is defined which is closed on two sides and open at opposite ends for a flow through of a first fluid. A second parting sheet then is superposed on the pair of spacer bars and another pair of spacer bars is placed on this sheet in positions like those of the first pair but at right angles thereto. A flow pass for a second fluid accordingly is provided at right angles to the first. Another parting sheet closes the top of this latter flow pass and the building process is continued until a heat exchanger core having the desired calculated heat dissipation capability is completed. The strip fins 12 are installed in alternating relation to the parting sheets and by virtue of their contact with the sheets provide additional, indirect heat transfer surface. The spacer bars 13 confine the fin strips along their side edges as described.

The sides of the core so formed accordingly present inlet and outlet faces for the different fluids. Headers, manifolds or like ducting is attached to the core faces to direct the fluids to and from the core. In the present instance the described ducting is comprised in part of top and bottom core sheets 15 and 16 which take the place of the parting sheets 10 at the top and bottom of the core. These are like the parting sheets 10, although they may be relatively thicker, and have relatively projecting ends 17 and 18 respectively, these jutting beyond or in overhanging relation to the core faces. Vertically extending strips 19 extend between the jutting extremities 17 and 18 at each corner location whereby to define at each face of the core an enclosure 21. While this may itself be considered the mentioned manifold or header, other duct work may be attached to the sides of the defined enclosure.

The tabs 14, together with the intervening tabular projections 11, define relatively solid corner columns 22 each having outturned surfaces 23 and 24 with respect to which the face of the core is relatively recessed. The column 22 provides a heavy structural means to which a manifold, or, in the present instance, the strips 19, may be attached. Thus, a long edge of each strip 19 is caused to abut the surface 23 or the surface 24 and is welded thereto, the weld being more secure on account of the solid, heavy character of the mounting column and because the damaging forces incident to the welding process are removed from the thin relatively unsupported sections at the face of the core. Moreover, the column 22 lends itself to machining whereby parts may be bolted thereto or secured in ways other than welding. Also, the surfaces 23 and 24 may be machined free of brazing alloy which may have accumulated thereon from the brazing process thus obviating a further cause of weld failure in the joining of stainless steel and like metals. As seen, the arrangement does not restrict flow through the defined flow passes between the parting sheets. The solid column 22 is a strong rigid member capable of accepting and evenly distributing manifold loads across the core face. The column is integrally brazed to the plate structure directly utilizing its load carrying capability. The construction is inherently resistant to leakage since the spacer bars are completely brazed between the parting sheets and core sheets, with the manifolds welded directly to the tabs and sheets. All possible leakage areas are accessible for repair by welding or brazing. In the instant construction no pressurized portions of the thin parting sheets, that is portions subject to the action of fluid pressure, are brazed to the heavy tabs. Thus there is high resistance to thermal failure. The inherent strength and rigidity of the heavy columns 22 is obtained at the point of attachment, yet thin sections are brazed to thin sections in areas where this may be critical.

The shape or the size of the tabs 14 is not limited and may be varied to suit specific core configurations and to reduce weight where necessary. The location of the tab is not, moreover, limited to the corners of the core or to the ends of the spacer bars. They may be placed at any location along the bars where an attachment is desired. A tab column may be formed in the manner illustrated wherever it may be desired to provide an attachment for fixing the core to another supporting member.

Manifolds may be attached to the tab columns by various methods including welding and brazing. The tab column might additionally be machined to provide a slot to improve a braze type joint. Also the column might be machined and tapped holes added to provide a bolted, flange face.

Still further, the parting sheets 10 may, instead of being cut away at its ends to define the tabular projections 11 be formed with straight sides as indicated by the dotted line 24 in FIG. 1. In accordance with this concept while the face of the core as represented by the terminal ends of the strip fins 12 would be recessed relative to the column surfaces 23 and 24, the parting sheets 10 would present relatively projecting portions disposed between adjacent columns 22. These projections provide surfaces or ledges upon which the braze alloy may be deposited with the subsequent brazing process causing the alloy to melt and flow inward along the peaks and valleys of the strip fins 12 to join these strips at their peaks and valleys to contacting parting sheets. The arrangement avoids the necessity of spraying or other means of applying the braze alloy to the core face preparatory to brazing. After the brazing process the projecting ends of the parting sheets, having served their purpose, may be removed. The concept of projecting ledges for deposit of brazing alloy is applicable, as will be understood, to heat exchange devices generally and is not limited to those having the instant columnar characteristics. Similarly, while the invention has been disclosed as particularly applicable to heat exchange devices made of heavy metals it is equally applicable to devices made of the light metals.

What is claimed is:

1. A plate type heat exchanger comprising superposed flat parting sheets, and bar spacers between said sheets, each of said spacers being an elongated member having an enlarged tab at each end projecting outwardly of the plane of the spacer in two directions at right angles to one another, said spacers being provided in laterally spaced apart pairs between adjacent sheets with vertically adjacent pairs of spacers being at right angles to one another, adjacent like tabs of underlying and overlying bar spacers being aligned with one another, said parting sheets having projected portions received between said tabs in alternating relation thereto and defining with said tabs continuous vertical mounting columns each having projected faces at right angles to one another.

2. A plate type heat exchanger according to claim 1, characterized by header means attached to said heat exchanger at the locations of said mounting columns to each of said projected faces.

3. A plate type heat exchanger comprising a stacked assembly of alternating parting sheets and spacer elements, there being a pair of spacer elements between each adjacent pair of parting sheets extending along respective opposing margins thereof, and enlarged tabs on the ends of said spacers coinciding with the corners of said sheets, said tabs projecting in two directions at right angles to one another relative to the plane of respective spacers, aligned tabs and sheet corners defining relatively heavy vertically extending mounting columns, the corners of said parting sheets being formed as projecting tabs corresponding in configuration to the tabs on said spacers, faces of the heat exchanger between said columns being relatively recessed.

4. A plate-type heat exchanger, including four-sided parting sheets and strip fin material stacked in an alternating superposed relation, said fin material having opposite side and end margins with alternate strips being disposed at right angles to one another, bar spacers between adjacent parting sheets along two opposing sides thereof, the spacers between adjacent pairs of sheets being at right angles to one another in confining relation to side edges of respective strips of fin material, the ends of said fin material cooperating with other opposing sides of said parting sheets and with adjacent bar spacers to define a core face on each of four sides of the heat exchanger; characterized by a tab on each end of said bar spacers projected relatively to the end of the spacer and to one side thereof to present surfaces at right angles to one another projected relatively to respective core faces, said sheets having corner portions received between vertically adjacent tabs and defining therewith vertically extending mounting columns presenting surfaces for welding at right angles to one another and remote from respective core faces.

5. A plate-type heat exchanger according to claim 4, characterized in that said tabs are square-shaped and cut out at one corner to receive the end of a respective bar spacer, one side of said tab being formed as a continuation of said spacer.

6. A plate-type heat exchanger according to claim 4, characterized in that at least some of said parting sheets are elongated relatively to said strip fin material to define at the core face projecting ledges to receive and hold brazing alloy preparatory to brazing.

7. A brazed plate-type heat exchanger, including a plurality of four sided parting sheets in superposed relation, a pair of laterally spaced apart elongated bar spacers interposed between margins of each adjacent pair of parting sheets, the bar spacers above and below an intervening parting sheet being disposed at right angles to one another, said sheets and said spacers defining series of lateral flow passes, adjacent passes being at right angles to one another, said bar spacers being disposed in planes parallel to and inwardly spaced from respective adjacent edges of said parting sheets, and strip fin means disposed in said flow passes with its opposite ends terminating in said last named planes, the construction and arrangement of parts providing outwardly projecting ledges at the location of each parting sheet for deposit of brazing alloy thereon, and projecting tabs at the extremities of said bar spacers aligned with tabs on vertically adjacent spacers and with the corners of said parting sheets to define relatively heavy mounting columns at the corners of the heat exchanger, each tab being square-shaped and presenting faces at right angles to one another projected relatively to respective ones of said planes at different sides of the superposed parting sheets, the corners of the parting sheets having projecting configurations like said tabs and received therebetween to define said mounting columns, each column having two attachment surfaces at right angles to one another.

References Cited by the Examiner

UNITED STATES PATENTS

| | | | |
|---|---|---|---|
| 2,361,691 | 10/1944 | Jendrassik | 165—166 |
| 2,368,814 | 2/1945 | Fagan | 165—166 |
| 2,566,310 | 9/1951 | Burns et al. | 165—167 |
| 2,846,198 | 8/1958 | Sturges | 165—166 |
| 2,961,222 | 11/1960 | Butt | 165—166 |

FOREIGN PATENTS

| | | |
|---|---|---|
| 1,125,663 | 7/1956 | France. |
| 838,466 | 6/1960 | Great Britain. |
| 860,359 | 2/1961 | Great Britain. |

ROBERT A. O'LEARY, *Primary Examiner.*

CHARLES SUKALO, FREDERICK L. MATTESON, JR., *Examiners.*

S. W. MILLARD, *Assistant Examiner.*